United States Patent
Ohba et al.

(10) Patent No.: US 9,619,868 B2
(45) Date of Patent: Apr. 11, 2017

(54) INFORMATION PROCESSING DEVICE, INFORMATION PROCESSING SYSTEM, AND INFORMATION PROCESSING METHOD

(71) Applicant: Sony Computer Entertainment Inc., Tokyo (JP)

(72) Inventors: Akio Ohba, Kanagawa (JP); Hiroyuki Segawa, Kanagawa (JP); Tetsugo Inada, Kanagawa (JP); Hidehiko Ogasawara, Tokyo (JP); Hirofumi Okamoto, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/652,536

(22) PCT Filed: Jul. 22, 2013

(86) PCT No.: PCT/JP2013/004436
§ 371 (c)(1),
(2) Date: Jun. 16, 2015

(87) PCT Pub. No.: WO2014/103094
PCT Pub. Date: Jul. 3, 2014

(65) Prior Publication Data
US 2015/0339805 A1    Nov. 26, 2015

(30) Foreign Application Priority Data

Dec. 27, 2012  (JP) .................................. 2012-285597

(51) Int. Cl.
*G06K 9/54*  (2006.01)
*G06T 5/00*  (2006.01)
(Continued)

(52) U.S. Cl.
CPC ................ *G06T 5/00* (2013.01); *G06F 3/005* (2013.01); *G06F 3/011* (2013.01); *G06F 3/0304* (2013.01);
(Continued)

(58) Field of Classification Search
CPC . G06T 5/00; G06T 5/40; G06F 3/0304; G06F 3/005; G06F 3/011; G06K 9/6201;
(Continued)

(56) References Cited

U.S. PATENT DOCUMENTS 6,987,534 B1    1/2006  Seta
7,139,424 B2 *  11/2006  Sogawa ............. H04N 13/0239
                                                       348/43
(Continued)

FOREIGN PATENT DOCUMENTS

CN       1788486 A      6/2006
CN       101371271 A    2/2009
(Continued)

OTHER PUBLICATIONS

International Preliminary Report on Patentability and Written Opinion for corresponding PCT Application No. PCT/JP2013/004436, 8 pages, dated Jul. 9, 2015.
(Continued)

*Primary Examiner* — Sheela C Chawan
(74) *Attorney, Agent, or Firm* — Matthew B. Dernier, Esq.

(57) ABSTRACT

An imaging device includes a first camera and a second camera and shoots the same object under different shooting conditions. A shot-image data acquirer of an image analyzer acquires data of two images simultaneously shot from the imaging device. A correcting section aligns the distributions of the luminance value between the two images by carrying out correction for either one of the two images. A correction
(Continued)

table managing section switches and generates a correction table to be used according to the function implemented by the information processing device. A correction table storage stores the correction table showing the correspondence relationship between the luminance values before and after correction. A depth image generator performs stereo matching by using the two images and generates a depth image.

10 Claims, 9 Drawing Sheets

(51) Int. Cl.

| | | |
|---|---|---|
| *G06F 3/03* | (2006.01) | |
| *H04N 13/00* | (2006.01) | |
| *G06K 9/62* | (2006.01) | |
| *G06T 5/40* | (2006.01) | |
| *G06F 3/01* | (2006.01) | |
| *H04N 5/225* | (2006.01) | |
| *H04N 5/235* | (2006.01) | |
| *G06F 3/00* | (2006.01) | |
| *G06T 5/50* | (2006.01) | |

(52) U.S. Cl.
CPC ............ *G06K 9/6201* (2013.01); *G06T 5/009* (2013.01); *G06T 5/40* (2013.01); *G06T 5/50* (2013.01); *H04N 5/2258* (2013.01); *H04N 5/2353* (2013.01); *H04N 5/2355* (2013.01); *H04N 13/00* (2013.01); *H04N 13/004* (2013.01); *G06T 2207/10012* (2013.01); *H04N 2013/0074* (2013.01)

(58) Field of Classification Search
CPC .... H04N 13/00; H04N 5/2258; H04N 5/2353; H04N 5/2355; H04N 13/004; H04N 2013/0074
USPC ............... 382/154, 173, 175, 276, 305, 306; 709/224; 714/49, 805; 705/23
See application file for complete search history.

(56) References Cited

U.S. PATENT DOCUMENTS

| | | | | |
|---|---|---|---|---|
| 7,162,074 | B2* | 1/2007 | Shibayama | ........ H04N 13/0025 348/42 |
| 8,328,653 | B2* | 12/2012 | Lock | .................. A63B 24/0003 473/199 |
| 8,384,768 | B2* | 2/2013 | Link | .................. G06K 9/00778 348/187 |
| 8,600,157 | B2* | 12/2013 | Hsieh | ........................ G06T 5/50 382/167 |
| 8,661,918 | B2* | 3/2014 | Ohta | ...................... B25J 13/085 73/1.08 |
| 8,896,669 | B2 | 11/2014 | Moriwake | |
| 2003/0128273 | A1 | 7/2003 | Matsui | |
| 2012/0050492 | A1 | 3/2012 | Moriwake | |
| 2012/0242665 | A1 | 9/2012 | Peng | |
| 2013/0100255 | A1 | 4/2013 | Ohba | |

FOREIGN PATENT DOCUMENTS

| | | |
|---|---|---|
| CN | 102236785 A | 11/2011 |
| CN | 102387371 A | 3/2012 |
| JP | 11258654 A | 9/1999 |
| JP | 2000003448 A | 1/2000 |
| JP | 2000184396 A | 6/2000 |
| JP | 2001069402 A | 3/2001 |
| JP | 2011229054 A | 11/2011 |
| WO | 2007050885 A2 | 5/2007 |
| WO | 2012001755 A1 | 1/2012 |

OTHER PUBLICATIONS

International Search Report for corresponding PCT Application No. PCT/JP2013/004436, dated Sep. 10, 2013.
European Search Report o for corresponding EP Application No. 13869255.3, 7 pages, dated Jun. 30, 2016.
Office Action for corresponding CN Application No. 2013800673378, 18 pages, dated Sep. 20, 2016.

* cited by examiner

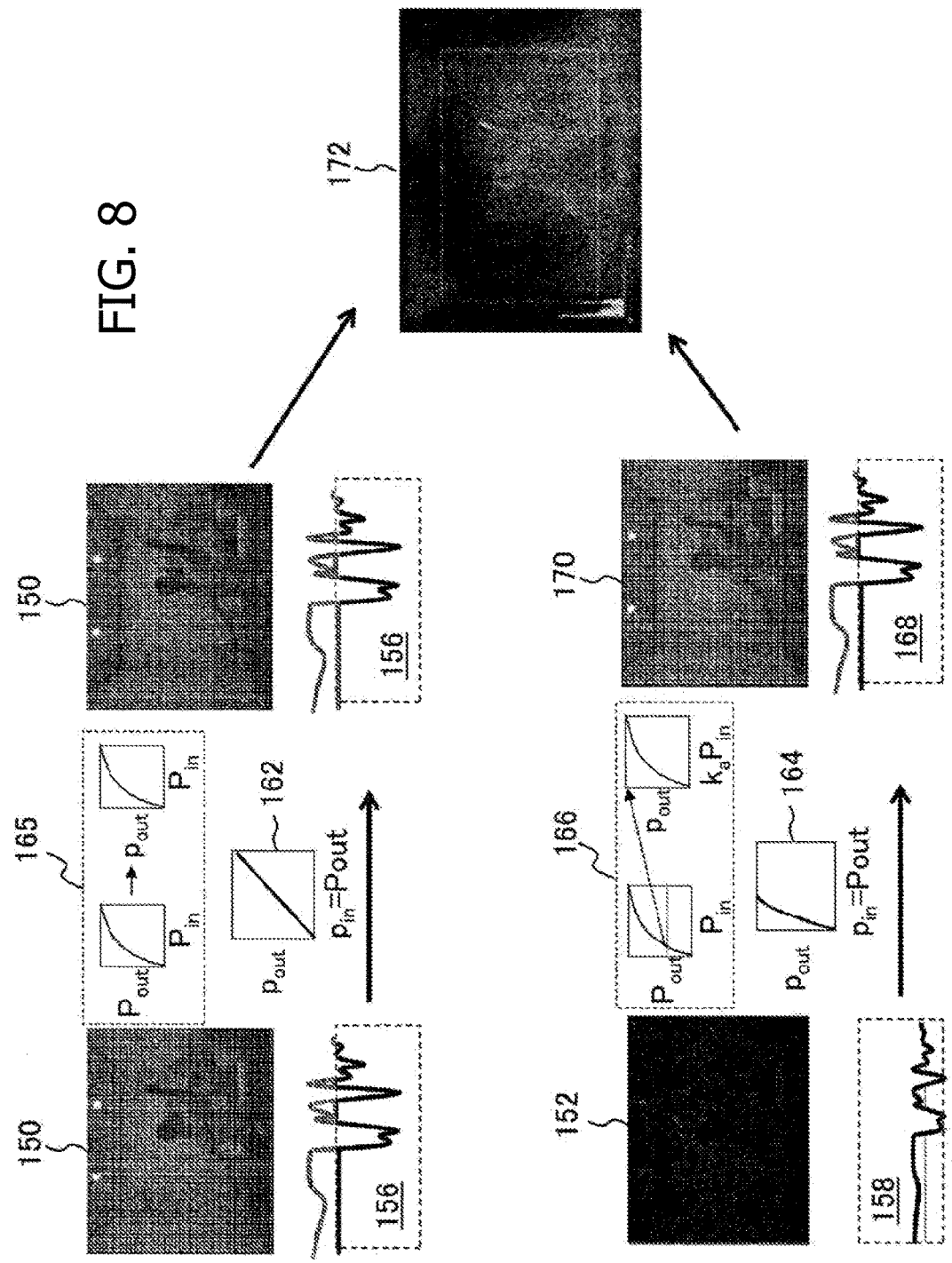

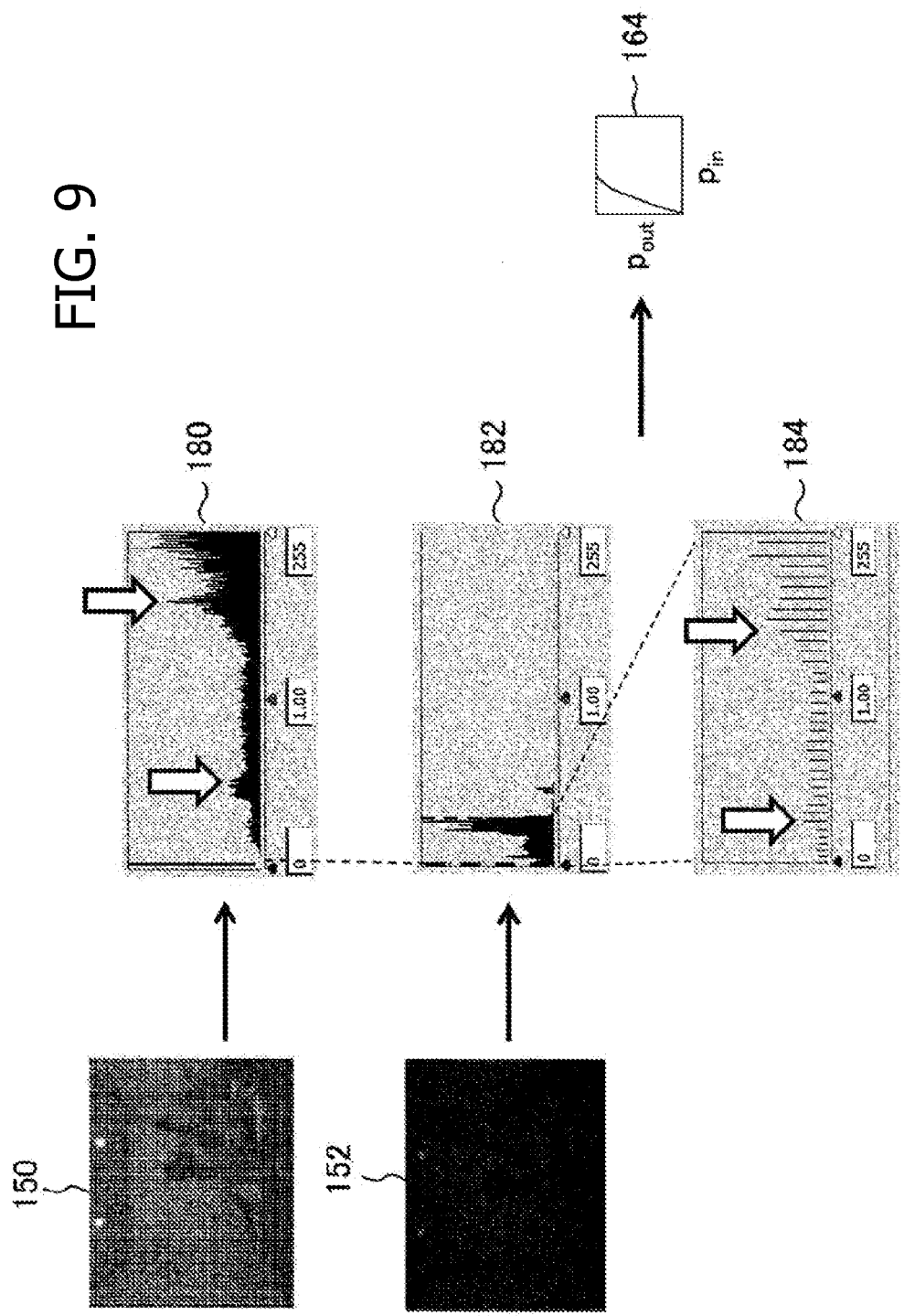

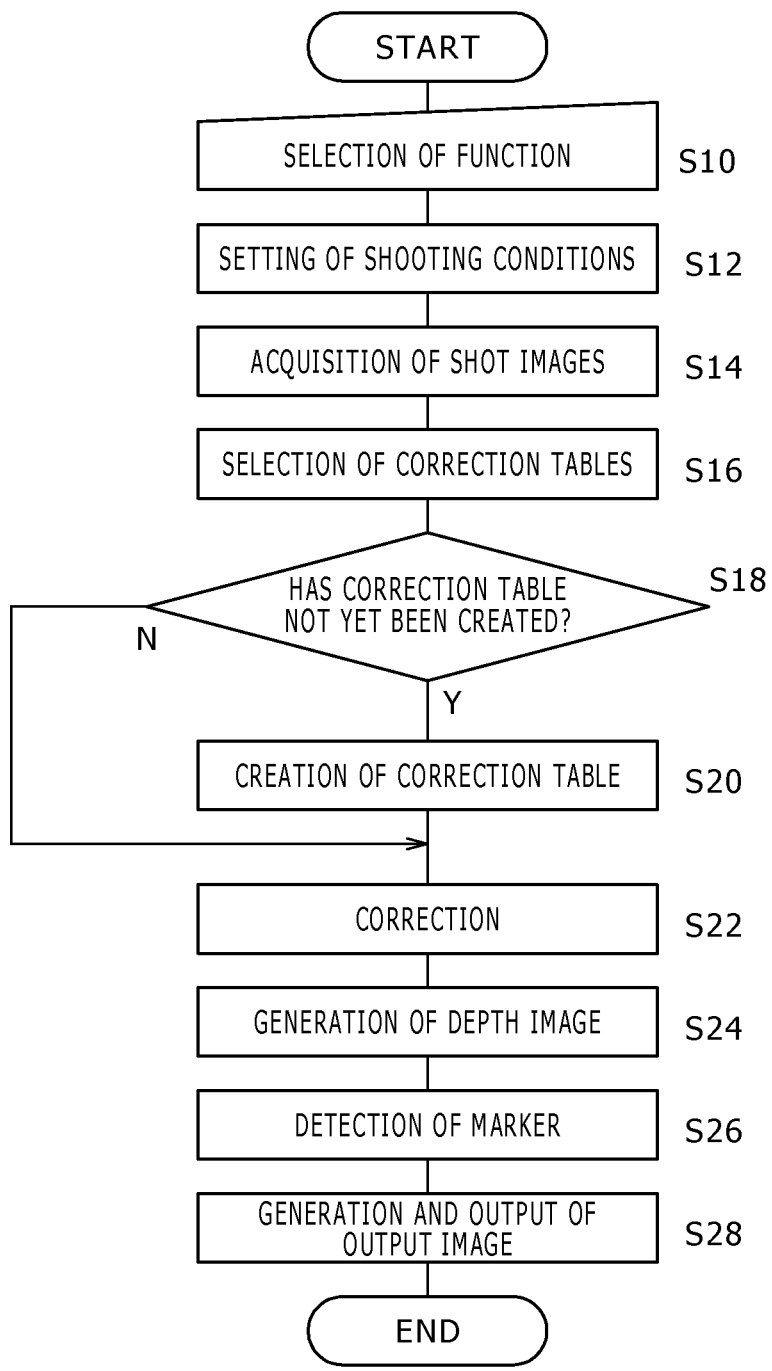

INFORMATION PROCESSING DEVICE, INFORMATION PROCESSING SYSTEM, AND INFORMATION PROCESSING METHOD

TECHNICAL FIELD

The present invention relates to an information processing device that generates an output image based on shot images, an information processing system, and an information processing method in the device and the system.

BACKGROUND ART

In recent years, it has been becoming common to equip a personal computer, a game machine, etc. with a camera and shoot a figure of a user to use the shot image in various forms. For example, systems to transmit an image of a user to the other side as it is via a network, such as a video phone and a video chat, and systems to recognize the motion of a user by image analysis and use the recognized motion as input information for a game or information processing have been put into practical use (refer to e.g. PLT 1).

CITATION LIST

Patent Literature

[PLT 1] WO 2007/050885 A2

SUMMARY

Technical Problem

To implement various kinds of processing by using a shot image with high responsiveness and high accuracy, shooting conditions matching the contents of the processing are required. However, in the present situation, it is difficult to enhance functions of the information processing device by only simply enhancing the performance and image quality of the camera in terms of the manufacturing cost, the transmission band of the image, the responsiveness from shooting to output, and so forth.

The present invention is made in view of such a problem and an object thereof is to provide a technique that can enhance functions of an information processing device using shot images inexpensively and efficiently.

Solution to Problem

A certain aspect of the present invention relates to an information processing device. This information processing device is an information processing device that acquires image data obtained by shooting a subject and generates data of an output image. The information processing device includes an image analyzer that corrects pixel values of at least either image of data of two images acquired from a connected camera in accordance with a correction rule for approximating distributions of the pixel value of the two images, and then acquires information on a subject based on a comparison between the two images, and an output image generator that generates and outputs the data of the output image based on the information on the subject acquired by the image analyzer.

Here, the "subject" is not limited to a person and so forth definitely positioned as a shooting target and includes room, person, object, animal, etc. that fall within the field of view of the camera. Therefore, an "individual piece of information relating to a subject" is not limited to an individual piece of information relating to the same individual substance. It can be information relating to any of plural individual substances included in a subject or may be an individual piece of information relating to another individual substance.

Another aspect of the present invention relates to an information processing system. This information processing system is an information processing system that shoots a subject and generates data of an output image by using image data of the subject. The information processing system includes a camera that shoots a subject and an information processing device that includes an image analyzer that corrects pixel values of at least either image of data of two images acquired from the camera in accordance with a correction rule for approximating distributions of the pixel value of the two images, and then acquires information on a subject based on a comparison between the two images, and an output image generator that generates and outputs the data of the output image based on the information acquired by the image analyzer.

Further another aspect of the present invention relates to an information processing method. This information processing method is an information processing method in which an information processing device acquires image data obtained by shooting a subject and generates data of an output image. The information processing method includes a step of acquiring data of shot two images from a connected camera, a step of correcting pixel values of at least either image of data of the two images in accordance with a correction rule for approximating distributions of the pixel value of the two images, and then acquiring information on a subject based on a comparison between the two images, and a step of generating the data of the output image based on the information on the subject and outputting the data of the output image to a display device.

What are obtained by translating arbitrary combinations of the above constituent elements and expressions of the present invention among method, device, system, computer program, and so forth are also effective as aspects of the present invention.

Advantageous Effect of Invention

According to the present invention, various functions using shot images can be implemented inexpensively.

BRIEF DESCRIPTION OF DRAWINGS

FIG. 8 is a diagram showing an example of change in luminance values by correction by a correcting section in the present embodiment.

FIG. 9 is a diagram for explaining a method in which a correction table managing section in the present embodiment analyzes a pair of images to generate a correction table.

FIG. 10 is a flowchart mainly showing the procedure of processing for accurately generating a depth image among kinds of processing in which the information processing device generates an output image from shot images.

DESCRIPTION OF EMBODIMENTS

Figure 1:
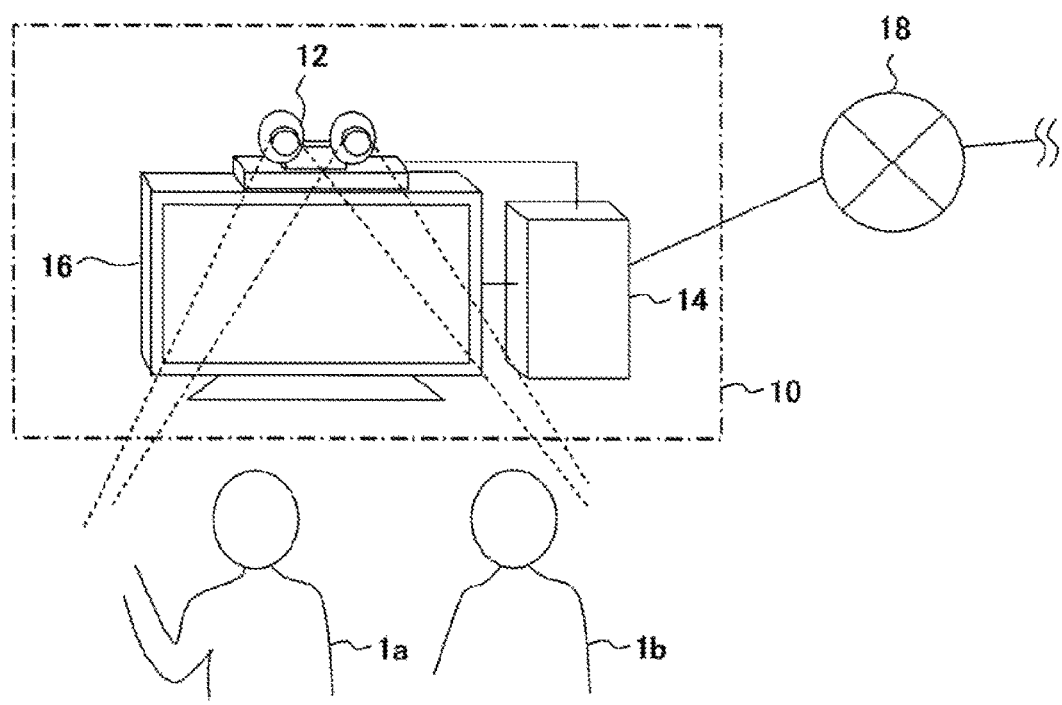
FIG. 1 is a diagram showing a configuration example of an information processing system to which the present embodiment can be applied.

FIG. 1 shows a configuration example of an information processing system to which the present embodiment can be applied. An information processing system 10 includes an imaging device 12 equipped with two cameras to shoot subjects such as users 1a and 1b, an information processing device 14 that executes information processing according to a request by the user based on a shot image, and a display device 16 that outputs image data obtained as a result of the processing by the information processing device 14. Furthermore, the information processing device 14 is made connectable to a network 18 such as the Internet.

The information processing device 14, the imaging device 12, the display device 16, and the network 18 may be connected by wired cables or may be wirelessly connected by a wireless LAN (Local Area Network) or the like. Any two or all of the imaging device 12, the information processing device 14, and the display device 16 may be combined to be integrally installed. Furthermore, the imaging device 12 does not necessarily need to be set on the display device 16. Moreover, the users 1a and 1b do not have to be a person and the number thereof is also not limited.

The imaging device 12 shoots subjects existing in the same space by the pair of cameras. As the imaging device 12, a stereo camera that has been put into practical use in order to acquire depth information of subjects or the like may be used. That is, the imaging device 12 may be a pair of cameras that can obtain substantially the same field of view by being placed alongside each other and each have lenses. Meanwhile, the interval and relative positions of the two cameras are not limited as long as the interval of the cameras is known and at least the correspondence relationship of part of the field of view can be derived by correcting the disparity.

At least one of the two cameras may be provided with an electronic zoom function and an electronic pan/tilter so that the field of view can be independently changed under control by the information processing device 14. Furthermore, at least any of shooting conditions such as white balance, frame rate, exposure time, and aperture value is made controllable by the information processing device 14 in the two cameras independently of each other.

The imaging device 12 acquires data of an image including the users 1a and 1b and so forth as a moving image or a still image under shooting conditions specified by the information processing device 14. The acquired image data is input to the information processing device 14. The information processing device 14 executes information processing according to a function specified by the user and generates image data to be output based on the image data acquired from the imaging device 12. The generated image data is output to the display device 16 or transmitted to another information processing device connected via the network 18. The display device 16 may be a television having a display to output images and a speaker to output sounds.

Figure 2:
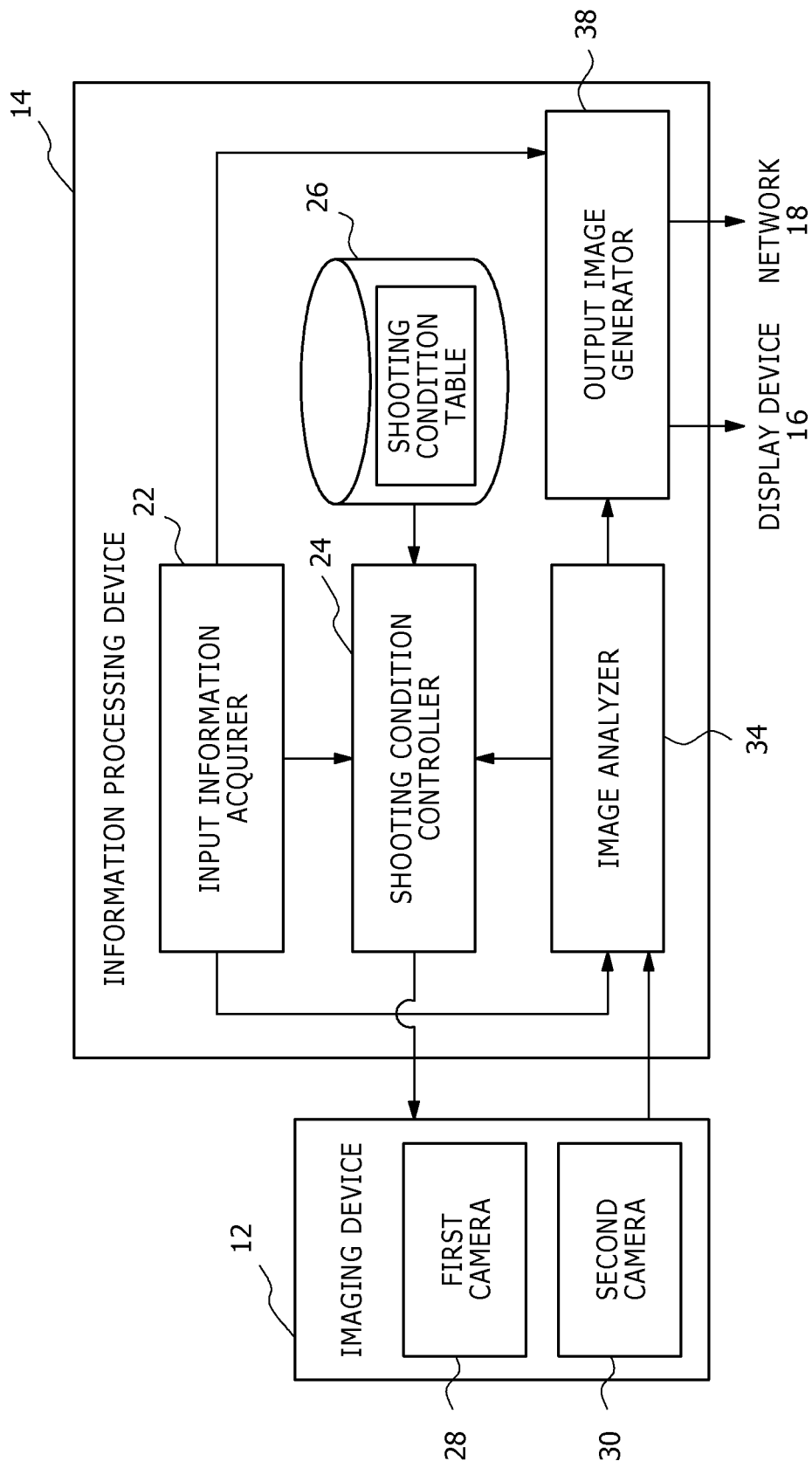
FIG. 2 is a diagram showing the configurations of an imaging device and an information processing device of the present embodiment in detail.

FIG. 2 shows the configurations of the imaging device 12 and the information processing device 14 in detail. The information processing device 14 includes an input information acquirer 22 that accepts an instruction input from the user, a shooting condition controller 24 that causes shooting to be started under shooting conditions decided based on an instruction by the user or an analysis result of a shot image, and a shooting condition storage 26 that stores a shooting condition table in which intended functions are associated with shooting conditions. The information processing device 14 further includes an image analyzer 34 that acquires an image shot by a first camera 28 and a second camera 30 mounted in the imaging device 12 and performs the necessary image analysis and an output image generator 38 that generates data of an image to be output as a result of the processing.

In terms of hardware, the respective elements described as functional blocks that execute various kinds of processing in FIG. 2 and FIG. 7 to be described later can be formed by CPU, memory, and other LSIs. In terms of software, they are implemented by a program to execute image processing or the like. Therefore, it is to be understood by those skilled in the art that these functional blocks can be implemented in various forms by only hardware, or only software, or a combination of them, and these functional blocks are not limited to any form.

The input information acquirer 22 is an interface that accepts an instruction input made to the information processing device 14 by the user and can be implemented by general input devices such as pointing device, mouse, keyboard, touch panel, game controller, and button. The input information acquirer 22 may be a device that has a casing separate from the main body of the information processing device 14 and is connected in a wireless or wired manner.

The instruction input by the user includes an input to select any of functions executable by the information processing device 14 and an input to move and select a cursor and a frame displayed on the display device 16. The information acquired by the input information acquirer 22 is notified to the shooting condition controller 24, the image analyzer 34, and the output image generator 38 as appropriate. Examples of the functions executable by the information processing device 14 will be described later.

The shooting condition controller 24 decides shooting conditions in the first camera 28 and the second camera 30 of the imaging device 12 in accordance with an instruction input made to the input information acquirer 22 by the user, and causes shooting to be started under the decided conditions by transmitting a shooting request signal to at least either one of the two cameras. The initial values of the shooting conditions are obtained by referring to the shooting condition table stored in the shooting condition storage 26 based on the function specified by the user. Furthermore, the shooting condition controller 24 may further decide the shooting conditions based on the result of analyzing an image shot by at least either one of the first camera 28 and the second camera 30, and cause at least either camera to start shooting under these conditions.

The image analyzer 34 acquires images shot by the first camera 28 and the second camera 30 and performs image analysis according to the function selected by the user. However, there is also a case in which the image analysis is unnecessary depending on the function selected by the user. In this case, the image analyzer 34 may directly send out image data to the output image generator 38. For this, the image analyzer 34 acquires information on the function selected by the user from the input information acquirer 22 and then executes processing based on it. The analysis result by the image analyzer 34 is transmitted to the output image generator 38 together with the necessary image data. This analysis result may be transmitted to the shooting condition controller 24 and used to further decide the shooting conditions.

The output image generator 38 generates data of an output image by using the analysis result and the necessary image data transmitted from the image analyzer 34, and outputs it to the display device 16 or the network 18. What kind of output image is to be generated differs depending on the function selected by the user. Thus, the output image generator 38 acquires information on the function selected by the user from the input information acquirer 22 and then executes processing based on it.

Figure 3:
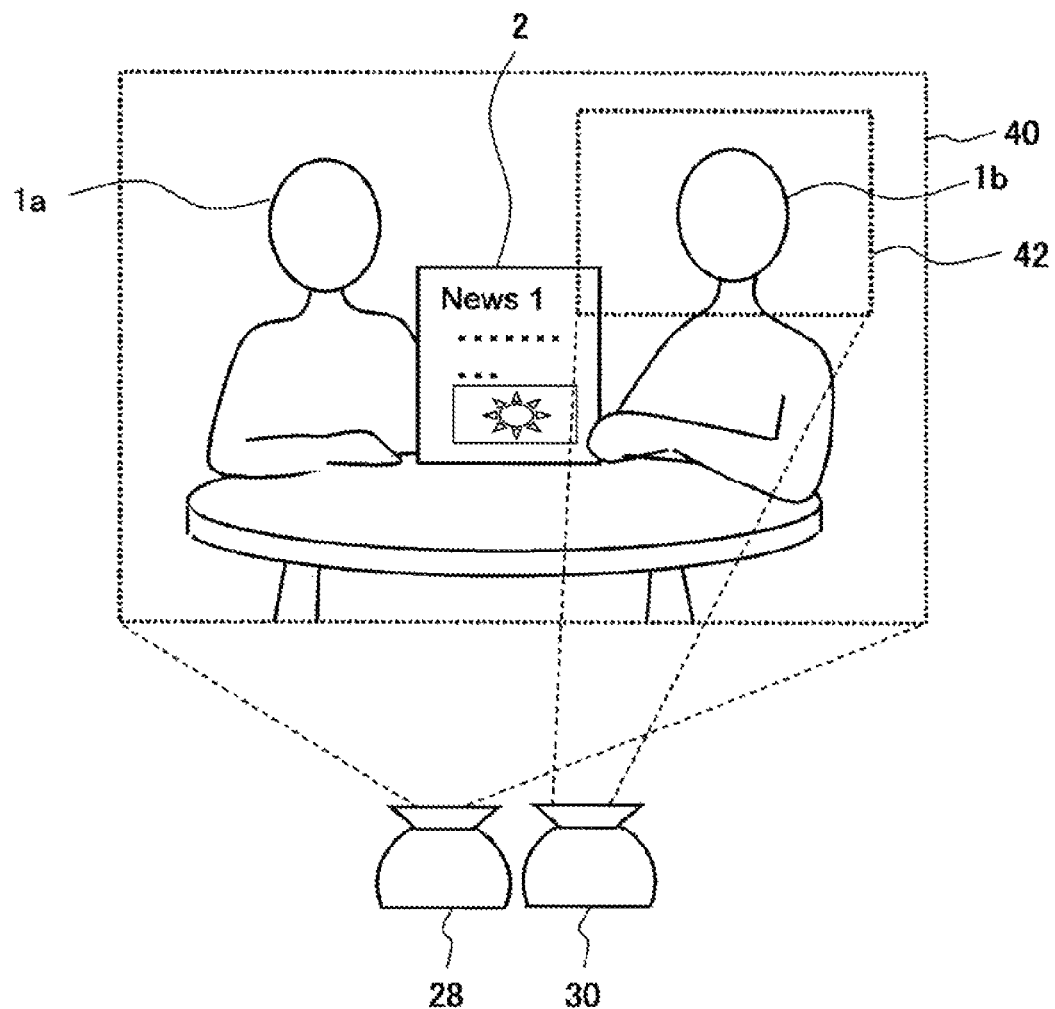
FIG. 3 is a diagram for explaining a shooting situation example assumed in the present embodiment.

Next, a specific example of functions implemented by the information processing system 10 will be described. FIG. 3 is a diagram for explaining a shooting situation example assumed in the present embodiment. In the example of this diagram, a situation in which two users 1a and 1b are seated at a table and have a conversation or the like is being shot by the first camera 28 and the second camera 30. The shooting target is not limited to a person such as the users 1a and 1b and may be an object such as a flip board 2 held by a user. Shot images are sequentially transmitted to another information processing system via the network 18 so as to be displayed on a display device of this another information processing system for example.

This makes it possible to view how the users 1a and 1b have the conversation at a remote place. Furthermore, by mutual execution of similar processing by two information processing systems 10, functions of a video chat or a video phone can be implemented. General techniques may be employed for procedures and so forth for establishment of a network and data transmission for exerting such functions and description thereof is omitted here. Furthermore, it is possible to employ not only the transmission of image data via a network but also a mode in which an image as a processing result is displayed on the display device 16 being viewed by the users 1a and 1b as the shooting targets and thereby the users 1a and 1b enjoy a game.

In such a situation, the information processing system 10 in the present embodiment shoots the same space by the two cameras under different conditions to thereby give additional value to the shot image and make output information. In the example of FIG. 3, the first camera 28 is shooting a region 40 of the whole space at a wide angle and the second camera 30 is shooting only a region 42 of the face of the user 1b at a narrow angle. At this time, the image shot by the second camera 30 is set to have the same pixel size as the image shot by the first camera 28.

As a result, the image shot by the second camera 30 has a higher resolution than the image shot by the first camera 28. This allows acquisition of images having different properties, i.e. the normal-resolution, wide-angle image shot by the first camera 28 and the high-resolution, narrow-angle image shot by the second camera 30. In the present embodiment, the same subject and space are simultaneously shot with difference in conditions in this manner and pieces of information possessed by the respective shot images are integrated to enable various kinds of processing.

Examples of functions implemented by the information processing system 10 will be specifically described below. These functions are exemplification and it suffices for the information processing system 10 to enable implementation of any one of these functions or a combination of any two or more. The following description does not intend that the information processing system 10 has all functions.

(1) Mode in which the Magnitude of the Angle of View and the Resolution are Made Different In the present mode, the angles of view at which the two cameras perform shooting are made different as described in FIG. 3. In this case, as described above, when the two cameras perform shooting with the same pixel size, a smaller angle of view provides a higher resolution. Furthermore, by synthesizing these images and outputting the resulting image, an image in which only a region of note, such as the face of a person, is represented in detail can be displayed.

Figure 4:
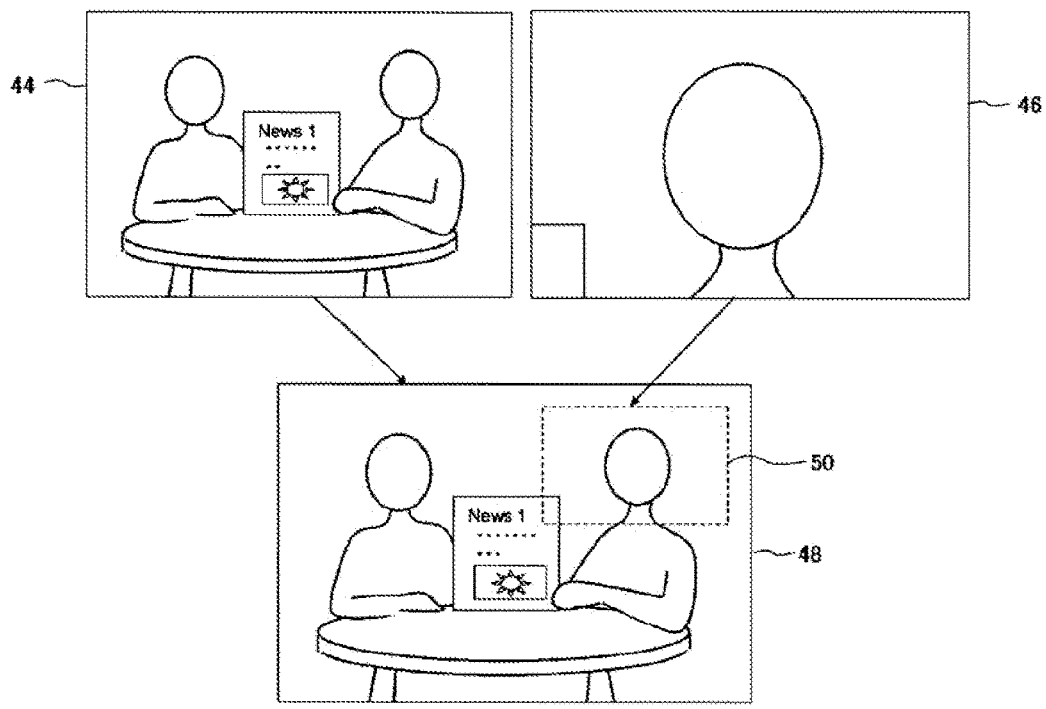
FIG. 4 is a diagram showing an example of images shot by the imaging device and an output image obtained by using them in a mode in which the magnitude of the angle of view and the resolution are made different.

FIG. 4 shows an example of images shot by the first camera 28 and the second camera 30 and an output image obtained by using them in the present mode. In this diagram, the image shot by the first camera 28 is a wide-angle image 44 of the region 40 in FIG. 3. The image shot by the second camera 30 is a narrow-angle image 46 of the region 42 in FIG. 3.

If the region area of the narrow-angle image 46 is one third of the region area of the wide-angle image 44 vertically and horizontally, the resolution of the narrow-angle image 46 is three times that of the wide-angle image 44 vertically and horizontally when the pixel sizes are equalized. The pixel sizes and the aspect ratios of the images do not need to be set exactly identical as above. An allowable range may be first defined about the size of image data in consideration of the processing ability and so forth and the relationship between the angle of view and the resolution may be decided as appropriate in this range.

To decide the field of view of the narrow-angle image 46, first the first camera 28 shoots the wide-angle image 44 and the image analyzer 34 executes face recognition processing to detect regions that can become targets of shooting at a narrow angle. Then, the output image generator 38 generates images representing the regions of the target candidates on the wide-angle image 44 and causes the display device 16 to display them. Then, the input information acquirer 22 accepts region selection by the user. At this time, the position of the region of the selected target in the wide-angle image 44 is stored.

In response to this, the shooting condition controller 24 causes the second camera 30 to shoot the region of the selected target. Thereby, simultaneous shooting of the wide-angle image and the narrow-angle image by the first camera 28 and the second camera 30 is started. Then, the output image generator 38 acquires data of the images shot by the respective cameras and synthesizes the narrow-angle image 46 at the corresponding region on the wide-angle image 44 to output the resulting image. As a result, it is possible to display a synthesized image 48 in which the resolution is high only in a region 50 of the target selected by the user in the wide-angle image 44.

Because the region having the high resolution at this time is part of the whole image, the demand to view in detail the region desired to be viewed can be met without weighing on the transmission band due to increase in the size of the image data. Furthermore, because it suffices for the cameras themselves to have general performance, the manufacturing cost does not increase.

A flip board held by a user may be shot as a narrow-angle image and an enlarged image thereof may be synthesized with the wide-angle image 44. In this case, the flip board is given markers having predetermined color and shape at its two corners on a diagonal among its four corners in advance for example. Furthermore, the image analyzer 34 detects the markers by pattern matching or the like and thereby detects the region of the flip board as a target candidate. In the case of enlarging the flip board, the area of the flip board shown after the synthesis is wider than the original flip board region in the wide-angle image. However, this can make it easier to view characters and so forth described on the flip board.

Furthermore, narrow-angle images of the regions of targets such as the face of the user 1a and the face of the user 1b may be shot by both the first camera 28 and the second camera 30 and these narrow-angle images may be synthesized on a still image of a wide-angle image shot before the shooting of the narrow-angle images. In this case, it is possible to display an image in which only the regions of the two targets in the synthesized image have a high resolution and motion whereas the other region is a still image. If this is employed, the number of targets can be increased to the number of cameras in a situation in which the regions desired to be viewed in detail are limited and the motion of the other region is not very important.

As the synthesized image, only two narrow-angle images may be enlarged according to the size of the screen of the display device 16 and be displayed alongside each other. Furthermore, in a case in which a target moves to a large extent, the first camera 28 may be made to shoot a wide-angle image and the image analyzer 34 may perform tracking of the target by an existing technique. In this case, the shooting condition controller 24 may adjust the field of view of each camera by using an electronic pan/tilter to make the target be always included in a narrow-angle image.

(2) Mode in which the Exposure Time/Aperture Value is Made Different

In the present mode, either one or both of the exposure time and the aperture value at the time of shooting is made different between the two cameras. In recent years, there has been proposed a technique in which a user is made to hold a marker such as a light emitter or wear it on the body and it is shot to detect the motion of the user and use the motion as input information for a game or the like. This technique holds based on the premise that the marker having specific size, color, shape, luminance, etc. can be always detected from a room, person, object, etc. captured as an image. However, differently from visual recognition by the human, how the marker appears in the image greatly changes depending on shooting environments such as ambient brightness, the presence/absence of objects, and ambient colors and shooting conditions such as the exposure time and the depth of focus.

In the case of shooting a wide-angle image including a user or a room, generally shooting conditions such as the white balance and the exposure time are automatically adjusted depending on the shooting environments and thereby an image well balanced as a whole is acquired. However, in the case of detecting a marker in the image, changing shooting conditions according to the environments as above changes how the marker appears, i.e. the color, size, shape, luminance, etc. of the image, which possibly causes trouble in the detection processing.

For example, in the case of using a marker that emits light, if the exposure time decided according to the brightness of the room is too long, possibly the RGB value of the light emitting part of the marker will be saturated and a glistening-white, contour-blurring image will be obtained irrespective of the color of the light emitter. Furthermore, when the marker is moving at a comparatively high speed, possibly its image will blur. Therefore, it becomes difficult to recognize the color of the marker or it becomes impossible to detect the marker itself in some cases.

Therefore, in the present mode, one camera shoots an overall image with standard exposure time and aperture value and the other camera performs shooting with either one or both of the exposure time and the aperture value set to the optimum value for the marker. This makes it possible to carry out the marker detection with high accuracy in any shooting environments while ensuring a well-balanced image having sufficient quality to be viewed as the image for being displayed finally.

The combination of the standard exposure time and aperture value for use for displaying and the exposure time and aperture value suitable for the marker detection is merely one example and does not intend to limit the use purpose of the images shot by the respective cameras. For example, shooting conditions of one camera may be set to exposure time and aperture value suitable for image analysis for obtaining the necessary information, such as face recognition, motion detection, or edge extraction, instead of being set to conditions suitable for the marker detection. If a shot image for use for displaying is unnecessary, the exposure time of both cameras may be made different from the standard value.

Figure 5:
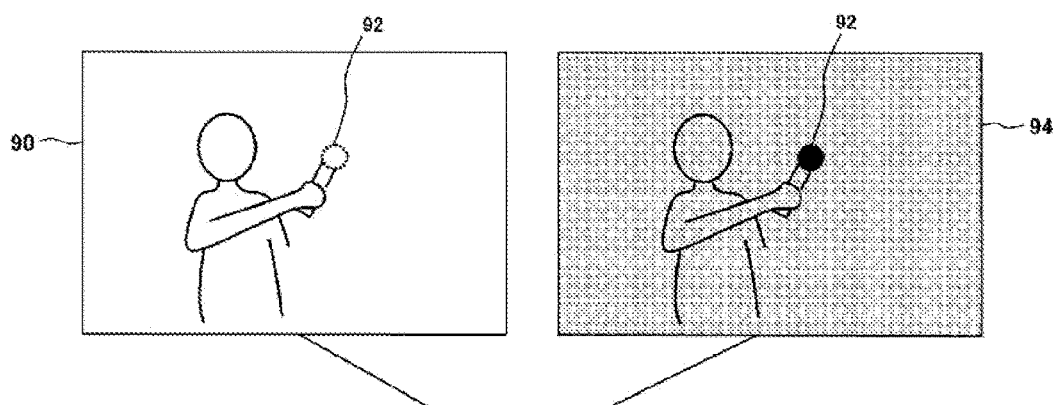
FIG. 5 is a diagram showing an example of the images shot by the imaging device and the output image obtained by using them in a mode in which the exposure time/aperture value is made different.

FIG. 5 shows an example of images shot by the first camera 28 and the second camera 30 and an output image obtained by using them in the present mode. In this diagram, the image shot by the first camera 28 is a general image 90 obtained by shooting a user who holds a marker 92 in which a spherical body at the tip emits light with the optimum exposure time and aperture value for the whole image. In this image, there is also a possibility that the light emitter of the marker 92 appears white irrespective of the actual color as described above. The shape of the marker is not limited to that shown in this diagram and any marker may be employed as long as its color, shape, size, luminance, etc. are known and it can serve as a detection target. Furthermore, the marker does not have to be a light emitter.

On the other hand, the image shot by the second camera 30 is a shooting-condition-adjusted image 94 shot with the optimum exposure time and aperture value for the light emitter of the marker 92. This image is e.g. an image shot with shorter exposure time and with focus on the marker 92, i.e. with a shallower depth of focus (smaller aperture value), compared with the general image 90. The exposure time is adjusted based on the shutter speed of an electronic shutter. Setting the shutter speed to higher speed provides shorter exposure time.

By such adjustment, the shooting-condition-adjusted image 94 is obtained as an image in which the color, shape, size, and luminance are close to the actual ones about the light emitter part of the marker 92 although the brightness is low totally and other objects blur. The shooting-condition-adjusted image 94 may be a narrow-angle image obtained by shooting only the marker part. In this case, position detection or tracking of the marker 92 may be carried out in combination with mode (1) depending on the accuracy required for the marker detection, the processing ability of the information processing device, and so forth.

The shooting conditions of each camera are read out from the shooting condition storage 26 and specified by the shooting condition controller 24 at the timing when the user selects this function. The shooting conditions of the first camera 28 may be set according to the environments of the spot by a normal calibration method. Furthermore, in the case of employing a narrow-angle image as the image of the second camera 30, the field of view of the narrow-angle image may be decided by detecting the approximate position of a marker by a wide-angle image similarly to mode (1).

The image analyzer 34 acquires the position of the marker by using the shooting-condition-adjusted image 94 and recognizes the motion of the user. Then, the output image generator 38 subjects the general image 90 to processing according to the motion to thereby generate an output image 98. In the example of FIG. 5, the image analyzer 34 recognizes that the user swings the marker 92 down and, in response to this, such displaying is carried out that the length of a sword 100 held by the user in a virtual world in the output image is extended.

In both modes (1) and (2) described thus far, shooting conditions of the two cameras are different and therefore possibly the image properties of the same subject will be different although the subject is simultaneously shot. In particular, in mode (2), a difference is intentionally set in the exposure time, which naturally leads to a large difference in the distribution range of the pixel value. Furthermore, even in mode (1), in which the view angle is changed, in the case of carrying out automatic adjustment to shooting conditions suitable for the respective view angles, there is a possibility that the exposure time and the aperture value are individually adjusted and consequently the distribution range of the pixel value differs.

On the other hand, these images are images simultaneously shot by two cameras having a known disparity although shooting conditions are different. Therefore, in the present embodiment, this characteristic is used and the position of a subject in a three-dimensional space is further identified by performing stereo matching between both images. This can further add information to the information obtained in modes (1) and (2), which can increase the variety of kinds of functions executable by the information processing device 14 and improve the accuracy of processing.

For example, in the output image 98 in FIG. 5, the position of the user's head or the like moving independently of the marker can be further identified. This allows implementation of a function to put another item on the head according to the position and cause this item to react in association with the motion of the head. An output image in which the motion of the marker and the motion of the head are combined to make some sort of reaction may be generated. Alternatively, in order to obtain the narrow-angle image 46 in FIG. 4, target candidates can be narrowed down depending on the position of a subject in the depth direction and the view angle can be set proper.

In general, in order to obtain the distance of a subject from a camera, feature points corresponding in stereo images shot by a stereo camera are extracted. The distance can be obtained on the principle of triangulation based on the deviation of the positions of these feature points on the images. In this processing, it is especially important to accurately extract the corresponding feature points from the stereo images. However, if the properties of the stereo images are different from each other as described above, possibly this extraction accuracy will not be kept and thus accurate position information cannot be obtained.

Figure 6:
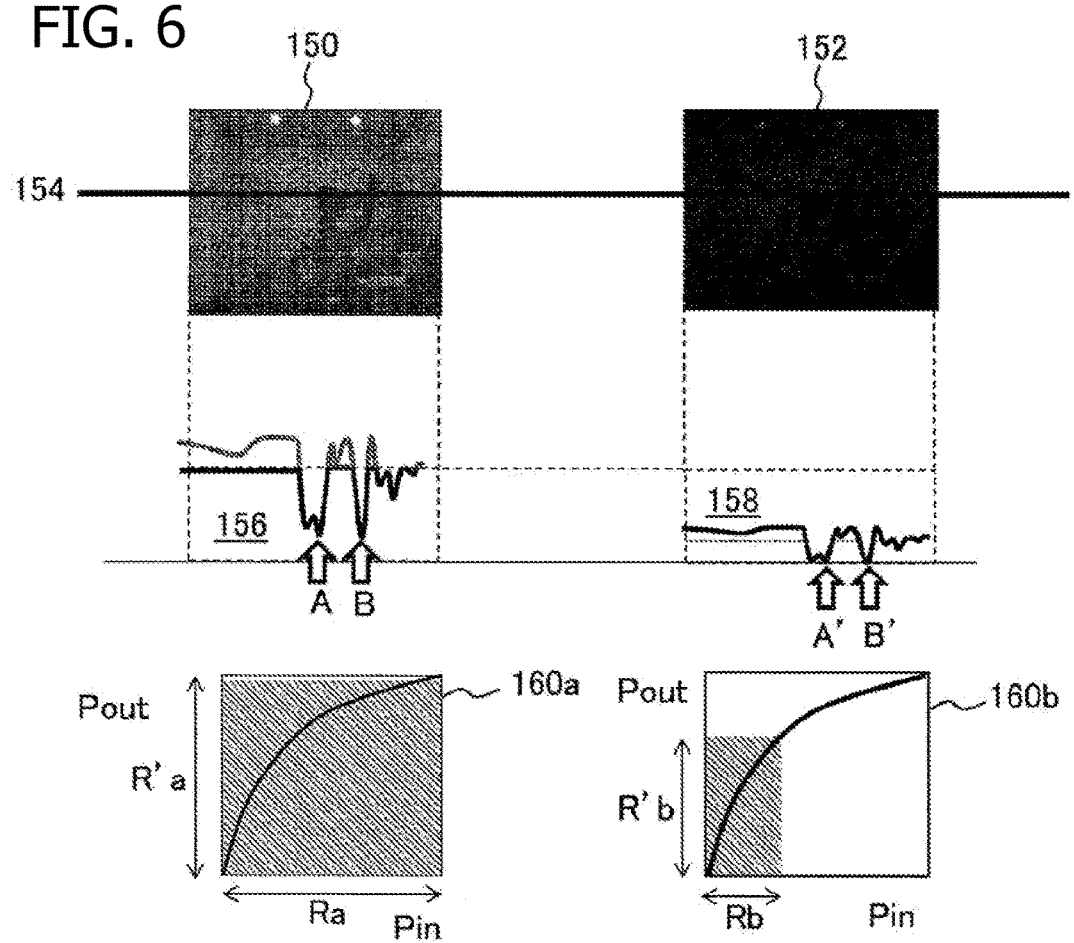
FIG. 6 is a diagram for explaining a problem in extraction of corresponding feature points from two images different in the exposure time.

FIG. 6 is a diagram for explaining a problem in extraction of corresponding feature points from two images different in the exposure time. In this diagram, images 150 and 152 are an example of images that are shot by the first camera 28 and the second camera 30, respectively, in the imaging device 12 and are transmitted from the imaging device 12 to the information processing device 14. In this example, shortening of the exposure time of the second camera 30 and so forth are carried out. Thus, the luminance of the image 152 is lower totally compared with the image 150 and the dynamic range is smaller.

A consideration will be made about acquiring data of such images by the image analyzer 34 of the information processing device 14 and extracting edges as feature points to perform stereo matching. The edge is a place where the pixel value such as the luminance drastically changes in the image and a general edge extraction filter can be used for the extraction processing. In this diagram, the respective luminance distributions at the position of a horizontal line 154 in the two images 150 and 152 are luminance distributions 156 and 158 on the lower row.

In principle, for example positions of arrows A and B about the image 150 and positions of arrows A' and B' about the image 152 are extracted as edges. Then, if the correspondence between the arrows A and A' is obtained by matching processing of the edge images, the position of e.g. the head of a person captured in the images in the three-dimensional space can be calculated from the deviation of the positions of both edges on the images. This applies also to the correspondence between the arrows B and B', which allows calculation of the position of e.g. a hand of the person.

However, if the distribution range of the luminance is different between the image 150 and the image 152, possibly even edges of the same subject will be different in how they are represented in edge images and it will be impossible to keep the matching accuracy. For example, in the luminance distribution 158 of the image 152 with the smaller dynamic range, there is a possibility that extracted edges are fewer compared with the image 150 because peaks of the luminance are not sharp and noise affects the extraction. Furthermore, the luminance of the image 150 with the longer exposure time is saturated. In this case, there is a possibility that extracted edges are few at bright parts.

Therefore, if the edge extraction and matching processing are carried out by using image data transmitted from the imaging device 12 as it is, the possibility that correct position information cannot be obtained is higher when shooting conditions of the two cameras differ to a larger extent, particularly when the exposure time differs to a larger extent. Hence, by artificially creating a state of an image as if the image were shot under the same conditions, the matching accuracy is kept. Basically, stereo matching is performed after correction to align the distribution range of the luminance is carried out. For example, the luminance value is corrected on the image 152 with the smaller distribution range so as to align its distribution range with the distribution range of the image 150. At this time, in the simplest idea, it will be thought to obtain the ratio of the maximum value of the luminance of the image 150 to the maximum value of the luminance of the image 152 and multiply all luminance values of the image 152 by this ratio.

This processing is effective in the case in which gamma correction is not carried out in the imaging device 12 or in the case in which linear correction to multiply all pixel values by a constant is carried out. The gamma correction is correction for causing pixel values acquired by imaging elements of a camera to provide favorable displaying balance on a display, and is normally carried out inside the camera. When the pixel value before correction is defined as $P_{in}$ and the pixel value after correction is defined as $P_{out}$, the gamma correction is executed based on the following correction expression.

$$P_{out} = P_{in}^{\left(\frac{1}{\gamma}\right)} \qquad [\text{Math. 1}]$$

Here, $\gamma$ is a value decided based on properties of an assumed display and so forth. On the lowermost row of FIG. 6, this correction expression is shown by curves in graphs 160a and 160b. Naturally, both are the same curve. Here, assuming that the pixel value is the luminance value, the luminance values $P_{out}$ after correction, obtained by using the luminance values $P_{in}$ acquired by the imaging elements, are the luminance values of the images 150 and 152 acquired by the information processing device 14. Here, a hatched region represented in each graph shows the range of the correction expression used for generating the corresponding image.

In the case of the image 150, a range Ra of the luminance value $P_{in}$ before correction and a range R'a of the luminance value $P_{out}$ after correction are both wide. On the other hand, in the case of the image 152, a range Rb of the luminance value $P_{in}$ before correction and a range R'b of the luminance value $P_{out}$ after correction are both smaller than the corresponding range of the image 150. However, the ratio R'b/R'a of the ranges of the luminance value $P_{out}$ after correction is larger compared with the ratio Rb/Ra of the ranges of the luminance value $P_{in}$ before correction. This is because the correction expression is non-linear and therefore the rate of change by the correction differs depending on the range of the original luminance value $P_{in}$. This applies also to the individual luminance values in the range.

Therefore, when the luminance values of all pixels of the image 152 are multiplied by the same ratio as described above, the image 152 does not become an image equivalent to the image 150. Specifically, as shown by the following expression, luminance $P''_{out}$ is obtained that is different from luminance $P'_{out}$ that is originally to be obtained if the gamma correction is carried out after the original pixel values $P_{in}$ of the image 152 are aligned with the same dynamic range as the image 150.

$$P'_{out} = (k_a \times P_{in})^{\left(\frac{1}{\gamma}\right)} \qquad [\text{Math. 2}]$$
$$P''_{out} = k_b \times P_{out} = k_b \times P_{in}^{\left(\frac{1}{\gamma}\right)}$$
$$P'_{out} \neq P''_{out}$$

Here, $k_a$ is a coefficient for aligning the dynamic range of the original luminance $P_{in}$ of the image 152 with the image before gamma correction of the image 150. $k_b$ is a coefficient for aligning the dynamic range of the luminance $P_{out}$ of the image 152 after gamma correction, input from the imaging device 12, with the image 150. In the above-described example, $k_b$ is the ratio of the maximum values of the luminance of the images 150 and 152. If the luminance of the image 150 is saturated as in FIG. 6, the maximum value of the luminance is different from the original value and therefore additionally the coefficient $k_b$ is also difficult to accurately calculate.

Therefore, the image analyzer 34 describes the correspondence relationship between the luminance before correction and the luminance after correction in advance and individually corrects the luminance $P_{out}$ so that the luminance $P_{out}$ in the above expression as the output value of the imaging device 12 may be corrected to approximately the luminance $P'_{out}$, which should be obtained originally. This allows alignment of not only the distribution range of the luminance but also the distribution itself between two images. Although this applies also when the color space represented by the pixel value is based on the RGB value or the like besides the luminance, a description will be made based on the assumption that the color space is based on the luminance in particular in the following.

Figure 7:
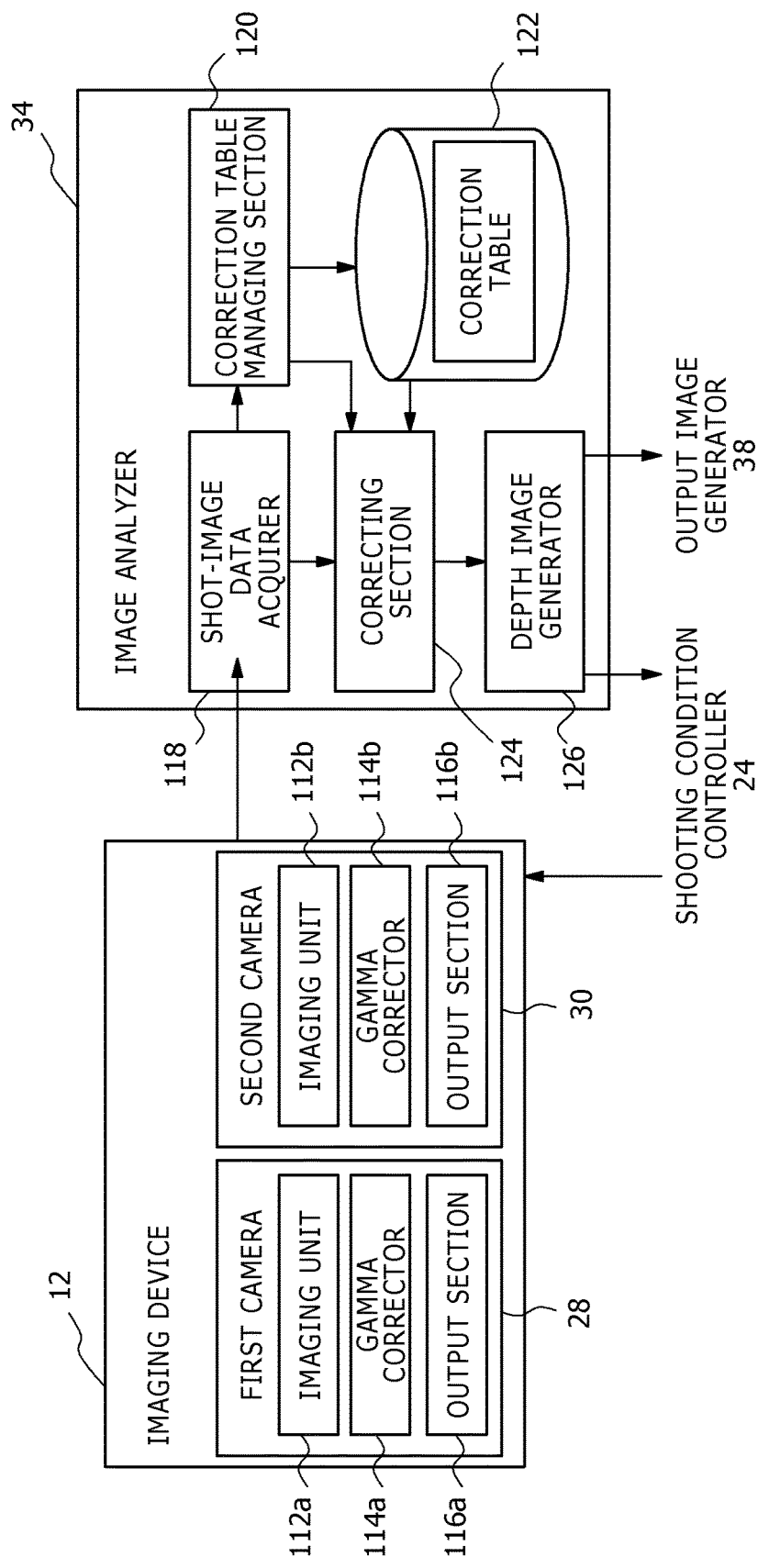
FIG. 7 is a diagram showing in detail the configurations of the imaging device and an image analyzer of the information processing device having a function to acquire position information of subjects in a three-dimensional space in the present embodiment.

FIG. 7 shows in detail the configurations of the imaging device 12 and the image analyzer 34 of the information processing device 14 having a function to acquire position information of subjects in a three-dimensional space. The imaging device 12 includes the first camera 28 and the second camera 30 as described above. The first camera 28 and the second camera 30 include imaging units 112a and 112b including plural imaging elements, gamma correctors 114a and 114b that carry out gamma correction for an image as an arrangement of pixel values acquired by the imaging elements, and output sections 116a and 116b that output data of the image after the gamma correction.

The imaging device 12 or each camera may further include a function to extract and interpolate a color component as the pixel value, a function to transmit image data to the image analyzer 34 of the information processing device 14, and so forth. However, it suffices for them to include general functions and therefore only functional blocks relating to the embodiment are shown in FIG. 7.

The image analyzer 34 includes a shot-image data acquirer 118 that acquires data of shot images from the imaging device 12, a correcting section 124 that carries out the above-described correction for at least either one of images simultaneously shot by the first camera 28 and the second camera 30, and a correction table storage 122 that stores correction tables showing the correspondence relationship between the luminance values before and after correction. The image analyzer 34 further includes a correction table managing section 120 that switches and generates the correction table to be used according to the function implemented by the information processing device 14, and a depth image generator 126 that performs stereo matching by using two images and generates a depth image. The depth image is an image in which the distances of subjects from the camera, obtained by the stereo matching, are represented as pixel values on an image plane, and is data representing the positions of the subjects in a three-dimensional space.

In the image analyzer 34 shown in FIG. 7, only functional blocks relating to the processing for creating the depth image with high accuracy are shown. However, various kinds of functions for implementing the above-described modes (1) and (2) may be further included therein. The shot-image data acquirer 118 acquires data of a pair of images simultaneously shot by the first camera 28 and the second camera 30 at the timing of generation of a depth image. This timing may be synchronized with generation processing of a display image or processing of another image analysis such as tracking, or may have a longer cycle. Furthermore, the acquired image data may be used also as image data used for generation processing of a display image or another image analysis.

The correction table managing section 120 selects the correction table advantageous to the generation of the depth image according to the function implemented by the information processing device 14 and shooting conditions decided based on it. Furthermore, the correction table managing section 120 creates such a correction table according to need. At the start of the creation of the correction table, the correction table managing section 120 performs image analysis on images themselves as the correction target. The format of the correction table is not limited as long as the pixel value after correction can be uniquely decided based on the pixel value before correction. The correction table may be a lookup table in which discrete values of the luminance values before correction are associated with the luminance values after correction or may be a correction expression.

The correction table managing section 120 creates histograms of the luminance of two images for example. Then, the correction table managing section 120 employs DP matching based on dynamic programming to obtain the amount of change in the luminance when the shapes of the histograms match at the highest degree while expanding and contracting the axis of the luminance about plural discrete luminance values. This conceptually corresponds to obtaining the coefficient $k_b$ for turning the luminance value $P''_{out}$ in the above expression to the luminance value $P'_{out}$, which should be obtained originally, for each of the individual luminance values. However, here, more directly, the correction table managing section 120 generates a lookup table in which a discrete value of the original luminance is associated with the destination of each luminance when the shapes of the histograms match. This causes the luminance value $P_{out}$ before correction to be approximately associated with the luminance value $P'_{out}$, which should be obtained originally. The generated table is stored in the correction table storage 122 as the correction table.

In the correction table storage 122, the correction table created through direct analysis of target images by the correction table managing section 120 in the above-described manner may be stored or any estimation expression may be stored in advance. For example, if $k_a$ in the above expression is estimated from the ratio of γ used for gamma correction in the imaging device 12 to the exposure time, the luminance value $P'_{out}$ desired to be obtained can be estimated from the luminance $P_{out}$ of an acquired image. Therefore, an expression or a lookup table representing it may be stored in advance.

Furthermore, in the correction table storage 122, different correction tables may be stored for each of conditions, such as for each of functions implementable by the information processing device 14 and for each of shooting conditions of each camera. For example, the correction table storage 122 stores correction tables for the case of correcting only one image to align it with the distribution of the luminance of the other image as in the above description and correction tables for the case of aligning both images with the distribution of the luminance of a standard image separately prepared. Thereby, even when both of two images are shot with non-standard exposure time, the images can be aligned with an image from which edge images can be easily obtained and the accuracy of the depth image can be kept.

In this case, the processing executed in the correction table managing section 120 also differs for each of conditions and therefore selection rules and creation rules of the correction table are set in association with the respective conditions also inside the correction table managing section 120. The correcting section 124 reads out the correction tables specified by the correction table managing section 120 from the correction table storage 122 and carries out correction by applying them to images as a correction target. This can generate a pair of images whose luminance distributions are aligned.

The depth image generator 126 performs stereo matching for a pair of images including the image after the correction by the correcting section 124 and generates a depth image. An existing technique can be applied to the stereo matching. For example, feature points such as edges may be extracted as described above and matching between these feature points may be performed, or images may be divided into regions and matching between regions may be performed. In any method, the matching accuracy can be kept even with images different in shooting conditions by accurately aligning the distributions of the luminance.

Data of the generated depth image is supplied to the output image generator 38 as position information of subjects in a three-dimensional space and thereby is used for generation of an output image according to this information. Alternatively, the data is supplied to the shooting condition controller 24 to thereby control the cameras of the imaging device 12 so that shooting may be performed with the field of view and focus fitted to a subject. Furthermore, the data may be supplied to another functional block not shown in the diagram in the image analyzer 34 and be used for processing such face detection, face recognition, or tracking.

FIG. 8 shows an example of change in the luminance values by correction by the correcting section 124. The image 150 and its luminance distribution 156 and the image 152 and its luminance distribution 158 are the same as those in the example shown in FIG. 6 and are data before correction by the image analyzer 34. Meanwhile, correction tables 162 and 164 for the respective images are stored in the correction table storage 122. The correction table managing section 120 may create the respective correction tables on the spot by analyzing the images 150 and 152 as described above or the correction tables may be estimated and set in advance. For example, the correction tables may be created in advance by using test images shot under the same shooting conditions.

The correcting section 124 decides after-correction values of the luminance values of all pixels by reading out the respective correction tables 162 and 164 from the correction table storage 122 and applying them to the images 150 and 152, respectively. In this diagram, the correction tables 162 and 164 are shown by graphs with the luminance value before correction defined as $p_{in}$ and with the luminance value after correction defined as $p_{out}$. However, they may be lookup tables as described above in practice. The luminance value $p_{in}$ before correction corresponds to the luminance value $P_{out}$ after gamma correction in the camera. Furthermore, in the case of using lookup tables, described luminance values are discrete values and therefore intermediate values between them are interpolated as appropriate to obtain the luminance values after correction.

In the case of FIG. 8, the purpose is to align the distribution of the luminance of the image 152, in which the luminance is low totally, with the standard image 150. Therefore, the image 150 does not need the correction. However, by preparing the correction table 162 in which $p_{in}=p_{out}$ is set, the final image can be obtained by the same processing irrespective of whether or not the correction is necessary. Above the correction tables 162 and 164, the meanings of the correction with the respective correction tables are shown. In each of graphs 165 and 166, the left graph represents the relationship of the luminance values $P_{out}$ after gamma correction in the camera with respect to the luminance values $P_{in}$ acquired by the imaging elements of the camera. The right graph represents the relationship of the luminance values $p_{out}$ after correction in the information processing device 14 with respect to the luminance values $P_{in}$ acquired by the imaging elements.

In the case of using the correction table 162, because $p_{in}=p_{out}$ is set as described above, the relationship of the luminance values $p_{out}$ after correction in the information processing device 14 with respect to the original luminance values $P_{in}$ is the same as the relationship of the luminance values $P_{out}$ after gamma correction by the camera. On the other hand, in the case of using the correction table 164, the distribution range of the luminance values $P_{out}$ after gamma correction by the camera is widened to the distribution range of the luminance value of the image 150 (arrow in the diagram). Furthermore, the rate of change in the luminance value is varied depending on the luminance value as is apparent from the non-linearity of the correction table 164. This allows obtainment of a correction relationship equivalent to that when gamma correction is carried out after the distribution range of the luminance value before the gamma correction is aligned in advance (luminance value $k_a P_{in}$ in the above expression).

As a result, about the image 150, the same luminance distribution 156 as that before correction and hence the same image 150 are obtained. About the image 152, luminance distribution 168 having a range equivalent to that of the image 150 and hence an image 170 equivalent to the image 150 are obtained. The depth image generator 126 uses the images 150 and 170 after correction to perform stereo matching through edge extraction and so forth, and thereby can generate a depth image 172 with high accuracy.

FIG. 9 is a diagram for explaining a method in which the correction table managing section 120 analyzes a pair of images to generate a correction table. As with the examples thus far, a consideration will be made about the case of carrying out correction to align the image 152 with low luminance with the image 150 with standard luminance. In this case, the correction table managing section 120 generates a luminance histogram of each image.

In a luminance histogram 180 of the image 150, the range of the luminance is wide. Possibly the luminance overflows beyond the maximum value of the luminance grayscale. On the other hand, in a luminance histogram 182 of the image 152, the range of the luminance value is small and biased toward small values. However, because both are images obtained by simultaneously shooting the same space, the shapes of the histograms relative to the respective luminance ranges should be approximately the same. However, because gamma correction is carried out as described above, the shapes of the histograms do not become the same shape by only simply magnifying the axis of the luminance (abscissa) by the same rate. Hence, matching based on dynamic programming (DP matching) is performed on these histograms. The DP matching itself is an existing technique used in various fields.

First, plural luminance values are discretely set as sample values in the luminance range of the luminance histogram 182. Then, the shape of the luminance histogram 182 is checked against the shape of the luminance histogram 180 with expansion and contraction of the axis of the luminance in the luminance histogram 182, and the amount of change in the luminance when the shapes match at the highest degree is acquired for each sample value of the luminance. The expansion/contraction rate of the axis of the luminance is carried out non-linearly for each sample value. Therefore, expanding the luminance histogram 182 of the image 152 by DP matching can obtain a luminance histogram 184 having the same shape as the luminance histogram 180 of the image 150. The correction table 164 can be generated by describing, as a table, the correspondence at this time between the sample values of the original luminance and the luminance values after expansion, obtained by adding the amounts of change to the sample values.

If the luminance of the image 150 overflows as described above and the maximum value of the luminance possessed by the data of the image 150 does not reflect the maximum value of the luminance actually shot, the associating with the maximum value of the luminance of the image 152, in which the luminance does not overflow, becomes impossible. In this case, there is a possibility that, even when simply multiplying the luminance of the image 152 by the same magnification factor ($k_b$ in the above expression) is attempted, this magnification factor itself cannot be accurately decided. By obtaining the correction table by using the luminance histogram based on information on the whole image, the luminance in an intermediate range can be properly changed. In addition, as shown in FIG. 8, in the image 170 after correction, overflow can be caused similarly to the image 150 about the pixels at which overflow should occur.

FIG. 9 is the example in which the image 152 is aligned with the image 150. However, by using a histogram of a reference image separately prepared, both the images 150 and 152 may be aligned with the reference image. In this case, DP matching with the histogram of the reference image is performed about each of the images 150 and 152 and thereby a correction table is generated for each image.

Next, the operation of the information processing device implemented by the configuration described thus far will be described. FIG. 10 is a flowchart mainly showing the procedure of processing for accurately generating a depth image among kinds of processing in which the information processing device 14 generates an output image from shot images. First, when a user makes an input to select any of functions executable by the information processing device 14, such as games, various kinds of information processing, and communications (S10), the shooting condition controller 24 reads out shooting conditions corresponding to the selected function from the shooting condition storage 26 and sets shooting conditions for the imaging device 12 based on them (S12).

In response to this, the first camera 28 and the second camera 30 of the imaging device 12 start shooting under the respective shooting conditions. Thereupon, the shot-image data acquirer 118 of the image analyzer 34 acquires data of two images shot at the same timing (S14). Gamma correction has been carried out for this data. Meanwhile, the correction table managing section 120 of the image analyzer 34 selects correction tables according to the function selected by the user in S10 (S16). At this time, as described above, a reference image with which the luminance distribution is to be aligned is decided and the correction tables applied to the respective images are selected according to it. The reference image may be either one of the images acquired in S14 or may be an image prepared in advance. Moreover, if there is a specific region about which a depth image is desired to be obtained with high accuracy, such as a face region or a hand region, setting in which this region is clipped from each image may be employed.

In the case of performing the clipping in this manner, switching between the following cases may be performed depending on the function selected by the user: the case of carrying out correction only for the clipped region and generating a depth image only about this region and the case of performing DP matching on a luminance histogram in the clipped region to create a correction table and executing correction processing itself for the whole image. For the region to be clipped, a result of face detection processing, tracking processing, matching processing, or the like separately executed by the image analyzer 34 according to the function selected by the user may be used. If one shot image itself is a narrow-angle image, a wide-angle image is clipped with the same region as the narrow-angle image.

Then, the correction table managing section 120 checks whether or not the decided correction tables are stored in the correction table storage 122 (S18). If the correction table is not stored and needs to be newly created (Y of S18), the correction table is created by the method described with FIG. 9 and is stored in the correction table storage 122 (S20). Once the correction table is created, correction can be carried out by using the same correction table while shooting is performed under the same shooting conditions (N of S18). Alternatively, as described above, without creating the correction tables on the spot, appropriate correction tables or correction expressions may be estimated in advance and be stored in the correction table storage 122.

The correction table managing section 120 notifies the correcting section 124 of identification information of the correction tables applied to the respective images, selected in S16. The correction table managing section 120 also notifies it of information on region clipping according to need. The correcting section 124 reads out the specified correction tables from the correction table storage 122 and corrects the pair of images acquired from the shot-image data acquirer 118 by using each correction table (S22). In the case of generating a depth image of only a specific region, this region is clipped in advance before the correction. Then, the depth image generator 126 generates a depth image by performing stereo matching on the pair of images after the correction (S24).

Meanwhile, the image analyzer 34 detects a marker held by a user from the image with the shorter exposure time and acquires its position for example (S26). Then, based on the position of the user obtained from the depth image and the position of the marker obtained from the result of the marker detection, the output image generator 38 generates data of an output image by rendering graphics on the image shot with the standard exposure time or processing a partial region, and outputs it to the display device 16 or the like (S28).

The processing executed in S26 separately from the processing for generating a depth image can be replaced by various kinds of processing as described in the above modes (1) and (2). Therefore, the processing of generating an output image in S28 is also not limited to the above-described example. In the case of shooting a moving image, the processing from S12 to S28 is repeated at a predetermined rate. The shooting conditions set in S12 may be the same or changing the field of view and the focus and so forth may be performed according to the result of the depth image, face detection, tracking, or the like. Furthermore, the rate of the processing of correcting images in S22 and then generating a depth image in S24, the rate of marker detection in S26, and the rate of generation and output of an output image in S28 may be decided independently of each other.

According to the present embodiment described above, by shooting the same space by using two cameras under different conditions, pieces of information specialized about the respective cameras are acquired in a mutually complementary manner and the positions of subjects in a three-dimensional space are also acquired by performing stereo matching on images of the cameras. This can drastically increase the amount of information that can be acquired by using the pair of images and exert various functions depending on the combination.

For images different in shooting conditions, correction of the pixel values is carried out before the stereo matching is performed, so that the deterioration of the matching accuracy due to the difference in image properties is prevented. Specifically, correction to align the distribution of the pixel value is carried out. At this time, a table in which the pixel values before correction are associated with the pixel values after correction is created so that the amounts of correction decided in consideration of gamma correction carried out inside the camera may be obtained. This table is created by performing DP matching of histograms of the pixel value of the respective images. Due to this, accurate correction based on actual images can be carried out even when the gamma value used in the gamma correction on the camera side is unknown or varies. Thus, the accuracy of the stereo matching can be kept.

Correction conditions, such as with what distribution of the pixel value the distribution of the correction target is to be aligned by the correction and whether the whole image is to be corrected or only a specific region is to be corrected, are switched according to the function required by the user, the use purpose of information to be obtained, and so forth. Thereby, the correction can be carried out under the optimum conditions with respect to shooting conditions and the use purpose and the accuracy of the image to be output finally and information can be enhanced. In particular, by combining the correction with processing of detecting a specific target object, such as face detection processing or tracking, and creating a correction table or aligning the distribution only about the region, the influence of dark regions readily affected by noise, a bright background in which the pixel value is readily saturated, and regions of a window or the like can be eliminated. As a result, the accuracy of detection of the position of the specific target object can be further improved.

The present invention is described above based on the embodiment. The above embodiment is exemplification and it is to be understood by those skilled in the art that various modification examples are possible regarding combinations of the respective constituent elements and the respective processing processes in the embodiment and such modification examples also fall within the scope of the present invention.

For example, in the present embodiment, the distribution ranges of the pixel value of stereo images simultaneously shot by two cameras are aligned. However, the target of the alignment is not limited to the stereo images and may be images shot at different timings, such as plural frames configuring one moving image. For example, in the case of performing matching of feature points or acquiring the amount of change between frames for the purpose of tracking of a target object or the like, if a shooting condition such as the exposure time changes at certain timing for any reason, a problem similar to that described with FIG. 6 occurs between the frames shot before and after the change.

Normally, the difference in the shooting timing between the frames as the matching target is subtle. Therefore, the compositions thereof will have almost no difference. Hence, if the distribution ranges of the pixel value are aligned by creating correction tables and carrying out correction similarly to the present embodiment, extraction of feature points can be equivalently carried out in both frames and the matching accuracy is improved. As a result, the motion and shape change of the target object can be tracked with high accuracy.

REFERENCE SIGNS LIST

10 Information processing system, 12 Imaging device, 14 Information processing device, 16 Display device, 18 Network, 22 Input information acquirer, 24 Shooting condition controller, 26 Shooting condition storage, 28 First camera, 30 Second camera, 34 Image analyzer, 38 Output image generator, 118 Shot-image data acquirer, 120 Correction table managing section, 122 Correction table storage, 124 Correcting section, 126 Depth image generator

INDUSTRIAL APPLICABILITY

As described above, the present invention can be applied to information processing devices such as computer, game machine, information terminal, image processing device, and image display device.

The invention claimed is:

1. An information processing device that acquires image data obtained by shooting a subject and generates data of an output image, the information processing device comprising:

an image analyzer circuit operating to: (i) acquire data of two images simultaneously shot under different shooting conditions from a first camera and a second camera, (ii) correct pixel values of at least one of the two images accordance with a selected correction rule for approximating distributions of the pixel values of the two images, (iii) switch among a plurality of correction rules depending on a function of the information processing device selected by the user in order to select the correction rule, (iv) obtain an individual piece of information relating to a same subject from each of the two images based on a comparison between the two images, and (v) acquire position information of the subject in a three-dimensional space by performing stereo matching on the two images for which pixel values of at least one of the two images have been corrected in accordance with the correction rule;

a shooting condition controller circuit operating to select the different shooting conditions of the first and second cameras according to the function of the information processing device selected by the user and controls the first and second cameras to perform shooting under the selected different shooting conditions; and an output image generator circuit operating to generate and output the data of the output image based on the information on the subject, the individual pieces of information, and the position information acquired by the image analyzer.

2. The information processing device according to claim 1, wherein the image analyzer corrects the pixel values with a correction rule among the plurality of correction rules such that a relationship between pixel values before correction and pixel values after correction is non-linear.

3. The information processing device according to claim 1, wherein the image analyzer generates histograms of the pixel value of the two images and obtains, by matching using dynamic programming, the amount of change in the pixel value when shapes of the two histograms match while non-linearly expanding and contracting an axis of the pixel value about discrete pixel values, and the image analyzer creates a table in which pixel values before and after the change are associated as at least one of the plurality of correction rules.

4. The information processing device according to claim 1, wherein the image analyzer generates histograms of the pixel value of the two images and obtains, by matching using dynamic programming, the amount of change in the pixel value when a shape of each of the generated two histograms matches a histogram of a reference image prepared in advance while non-linearly expanding and contracting an axis of the pixel value about discrete pixel values, to create a table in which pixel values before and after the change are associated as at least one of the plurality of correction rules for each of the two images.

5. The information processing device according to claim 1, wherein exposure time in shooting of an image shot by the second camera is shorter than exposure time in shooting of the image shot by the second camera in order to detect a position of a marker with which a target included in a subject is equipped, the image analyzer detects the position of the marker from the image shot by the second camera and acquires position information of the target different from the marker by the stereo matching, and the output image generator generates, as the data of the output image, data of an image obtained by subjecting an image shot by the first camera to processing set corresponding to the position of the marker and a position of the target.

6. The information processing device according to claim 1, wherein the shooting condition controller changes the shooting condition of at least either camera of the pair of cameras based on the position information acquired by the image analyzer by the stereo matching.

7. An information processing system that shoots a subject and generates data of an output image by using image data of the subject, the information processing system comprising:

a first camera that shoots the subject;
a second camera that shoots the subject; and
an information processing device that includes
an image analyzer circuit operating to: (i) acquire data of two images simultaneously shot under different shooting conditions from a first camera and a second camera, (ii) correct pixel values of at least one of the two images accordance with a selected correction rule for approximating distributions of the pixel values of the two images, (iii) switch among a plurality of correction rules depending on a function of the information processing device selected by the user in order to select the correction rule, (iv) obtain an individual piece of information relating to a same subject from each of the two images based on a comparison between the two images, and (v) acquire position information of the subject in a three-dimensional space by performing stereo matching on the two images for which pixel values of at least one of the two images have been corrected in accordance with the correction rule, and a shooting condition controller circuit operating to select the different shooting conditions of the first and second cameras according to the function of the information processing device selected by the user and controls the first and second cameras to perform shooting under the selected different shooting conditions, and an output image generator circuit operating to generate and output the data of the output image based on the information on the subject, the individual pieces of information, and the position information acquired by the image analyzer.

8. An information processing method in which an information processing device acquires image data obtained by shooting a subject and generates data of an output image, the information processing method comprising:

acquiring data of two images simultaneously shot under different shooting conditions from a first camera and a second camera;

correcting pixel values of at least one of the two images accordance with a selected correction rule for approximating distributions of the pixel values of the two images, (iii) switch among a plurality of correction rules depending on a function of the information processing device selected by the user in order to select the correction rule, (iv) obtain an individual piece of information relating to a same subject from each of the two images based on a comparison between the two images, and (v) acquire position information of the subject in a three-dimensional space by performing stereo matching on the two images for which pixel values of at least one of the two images have been corrected in accordance with the correction rule;

selecting the different shooting conditions of the first and second cameras according to the function of the information processing device selected by the user and controls the first and second cameras to perform shooting under the selected different shooting conditions; and generating and outputting the data of the output image based on the information on the subject, the individual pieces of information, and the position information.

9. An apparatus including a microprocessor and a storage medium containing a computer program for causing the apparatus to acquire image data obtained by shooting a subject and to generate data of an output image, by carrying out actions, comprising:

acquiring data of two images simultaneously shot under different shooting conditions from a first camera and a second camera;

correcting pixel values of at least one of the two images accordance with a selected correction rule for approximating distributions of the pixel values of the two images, (iii) switch among a plurality of correction rules depending on a function of the information processing device selected by the user in order to select the correction rule, (iv) obtain an individual piece of information relating to a same subject from each of the two images based on a comparison between the two images, and (v) acquire position information of the subject in a three-dimensional space by performing stereo matching on the two images for which pixel values of at least one of the two images have been corrected in accordance with the correction rule;

selecting the different shooting conditions of the first and second cameras according to the function of the information processing device selected by the user and controls the first and second cameras to perform shooting under the selected different shooting conditions; and generating and outputting the data of the output image based on the information on the subject, the individual pieces of information, and the position information.

10. A non-transitory, computer-readable recording medium containing a computer program, which when executed by a computer to acquire image data obtained by shooting a subject and to generate data of an output image, causes the computer to implement actions, comprising:

acquiring data of two images simultaneously shot under different shooting conditions from a first camera and a second camera;

correcting pixel values of at least one of the two images accordance with a selected correction rule for approximating distributions of the pixel values of the two images, (iii) switch among a plurality of correction rules depending on a function of the information processing device selected by the user in order to select the correction rule, (iv) obtain an individual piece of information relating to a same subject from each of the two images based on a comparison between the two images, and (v) acquire position information of the subject in a three-dimensional space by performing stereo matching on the two images for which pixel values of at least one of the two images have been corrected in accordance with the correction rule;

selecting the different shooting conditions of the first and second cameras according to the function of the information processing device selected by the user and controls the first and second cameras to perform shooting under the selected different shooting conditions; and generating and outputting the data of the output image based on the information on the subject, the individual pieces of information, and the position information.

* * * * *